(12) United States Patent
Pouzadoux et al.

(10) Patent No.: US 11,686,203 B2
(45) Date of Patent: Jun. 27, 2023

(54) FIBROUS TEXTURE FOR TURBINE ENGINE BLADE MADE OF COMPOSITE MATERIAL

(71) Applicant: SAFRAN AIRCRAFT ENGINES, Paris (FR)

(72) Inventors: Frédéric Jean-Bernard Pouzadoux, Moissy-Cramayel (FR); Jérémy Guivarc'h, Moissy-Cramayel (FR); Thomas Alain De Gaillard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/905,267

(22) PCT Filed: Feb. 19, 2021

(86) PCT No.: PCT/FR2021/050304
§ 371 (c)(1),
(2) Date: Aug. 30, 2022

(87) PCT Pub. No.: WO2021/176162
PCT Pub. Date: Sep. 10, 2021

(65) Prior Publication Data
US 2023/0113922 A1  Apr. 13, 2023

(30) Foreign Application Priority Data

Mar. 2, 2020 (FR) ...................... 2002078

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F05D 2220/323* (2013.01);
(Continued)

(58) Field of Classification Search
CPC .... F01D 5/147; F01D 5/282; F05D 2220/323; F05D 2240/24; F05D 2240/30; F05D 2300/6012; F05D 2300/6034
See application file for complete search history.

(56) References Cited

U.S. PATENT DOCUMENTS 9,162,750 B2     10/2015  Coupe et al.
2011/0293435 A1*  12/2011  McMillan ............... F01D 5/147
                                                        416/230
(Continued)

FOREIGN PATENT DOCUMENTS

EP     3287265 A1    2/2018
EP     3292991 A1    3/2018

OTHER PUBLICATIONS

French Search Report issued in French Application No. FR2002078 dated Oct. 5, 2020 (2 pages).
(Continued)

*Primary Examiner* — Aaron R Eastman
(74) *Attorney, Agent, or Firm* — Bookoff McAndrews, PLLC

(57) ABSTRACT

The invention relates to a fibrous texture intended to form the fibrous reinforcement of a turbine engine blade made of composite material, the texture being in a single piece and having a three-dimensional weave between a plurality of first fiber warp yarns or strands extending in a radial direction and a plurality of first fiber weft yarns or strands extending in a chord direction, the texture comprising a blade root portion and a blade airfoil portion extending between the blade root portion and a free end of the fibrous texture. The blade airfoil portion has a reinforced area in the vicinity of the free end of the texture comprising weft yarns or strands made of second fibers different from the first fibers.

9 Claims, 4 Drawing Sheets

(52) U.S. Cl.
CPC ...... *F05D 2240/24* (2013.01); *F05D 2240/30* (2013.01); *F05D 2300/6012* (2013.01); *F05D 2300/6034* (2013.01)

(56) References Cited

U.S. PATENT DOCUMENTS

| | | |
|---|---|---|
| 2013/0224035 A1 | 8/2013 | Alexander et al. |
| 2014/0369847 A1* | 12/2014 | Dambrine ............... F01D 5/147 |
| | | 139/384 R |
| 2016/0244897 A1* | 8/2016 | Gimat .................... B29C 70/24 |
| 2018/0045207 A1* | 2/2018 | Paquin ................... B29C 70/08 |
| 2020/0109634 A1* | 4/2020 | Gondre .................. F01D 5/147 |
| 2020/0223531 A1* | 7/2020 | Courtier ................. F04D 29/38 |
| 2022/0074309 A1* | 3/2022 | Dambrine ............... F01D 5/282 |
| 2023/0036499 A1* | 2/2023 | Reynolds ............... F01D 5/145 |

OTHER PUBLICATIONS

International Search Report and Written Opinion issued in International Application No. PCT/FR2021/050304 dated Jun. 11, 2021 (9 pages).

* cited by examiner

[Fig. 1]
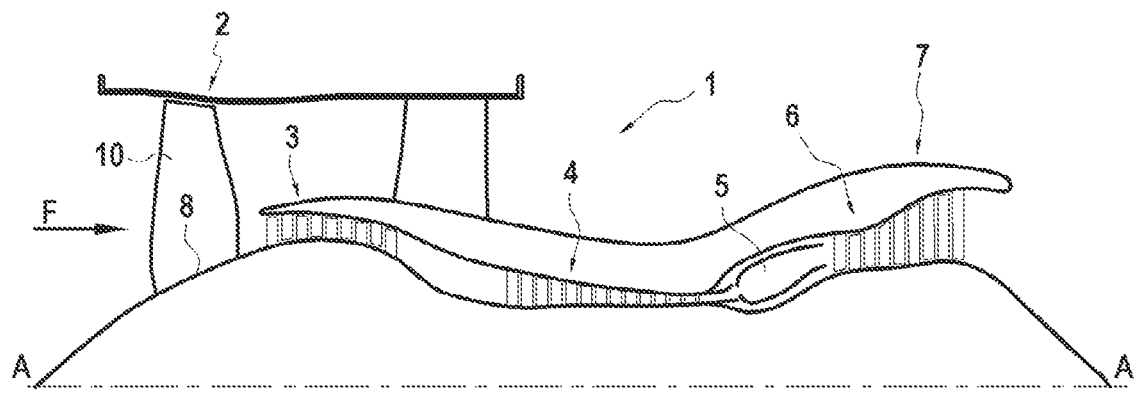
[Fig. 2]
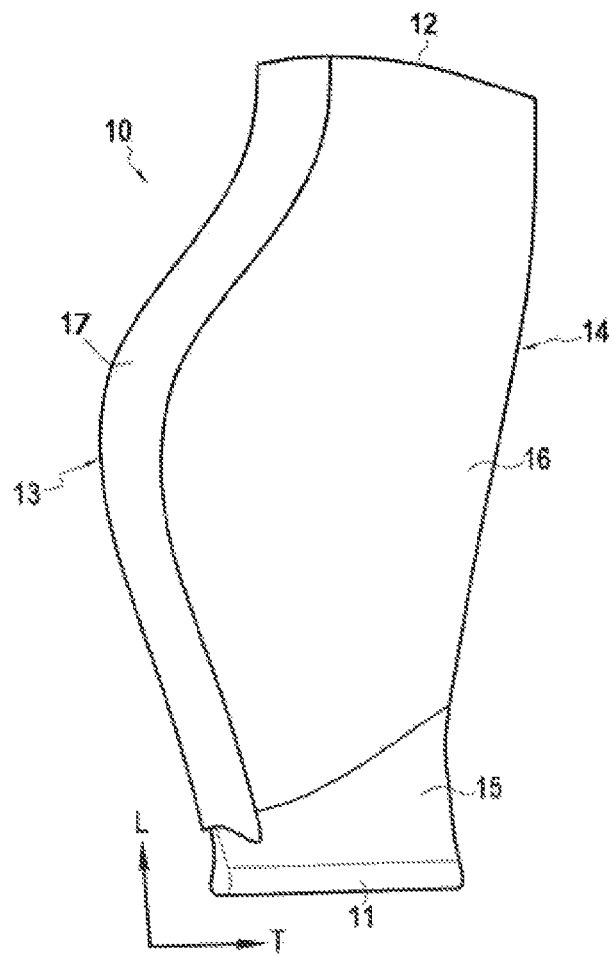

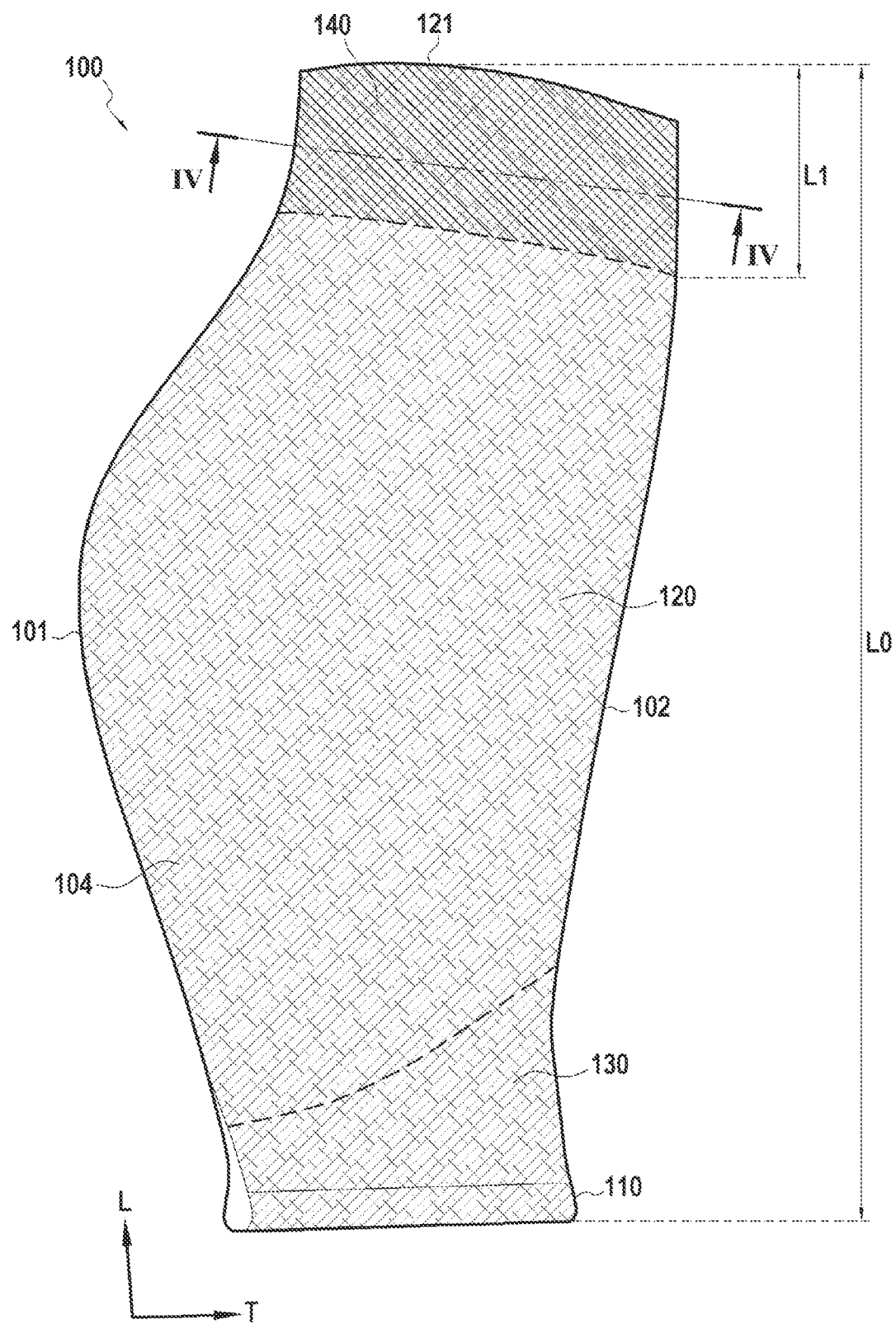
[Fig. 3]

[Fig. 4]
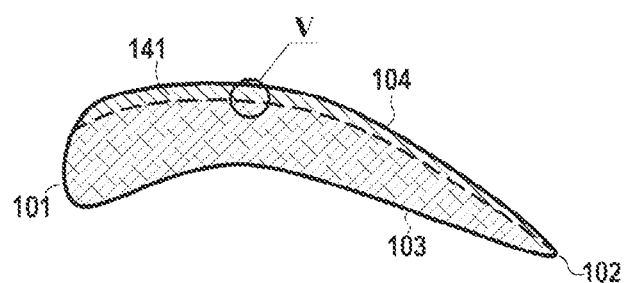
[Fig. 5]
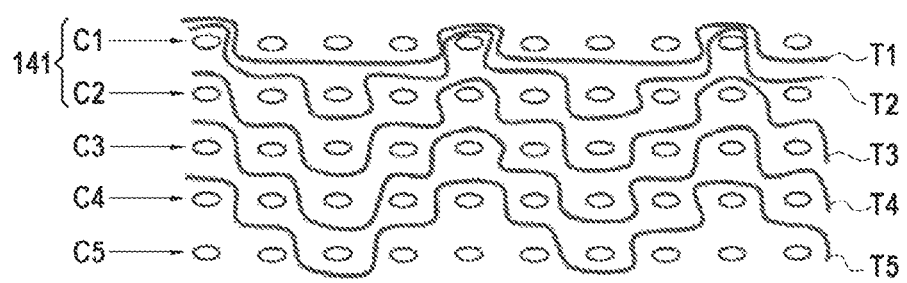

[Fig. 6]
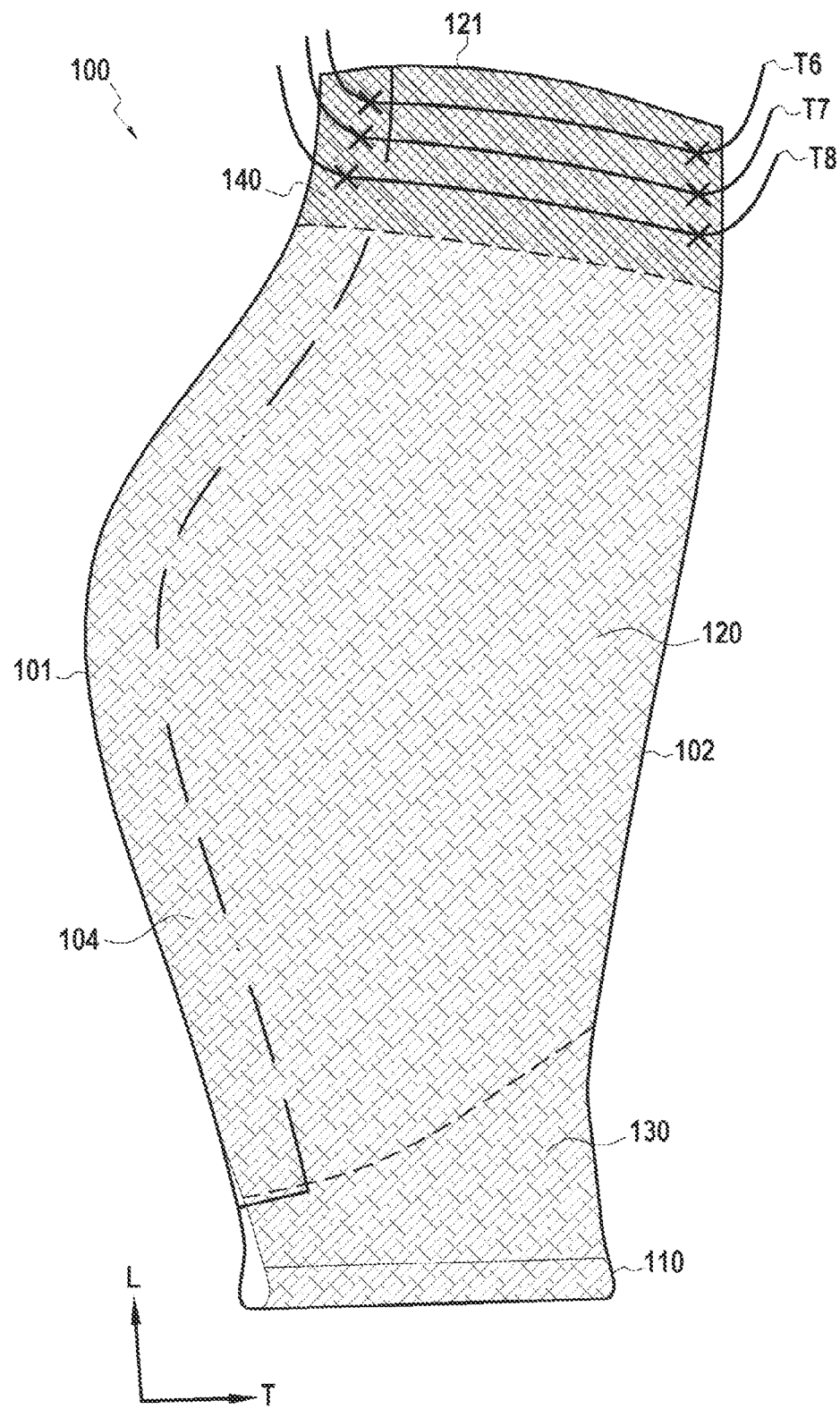

FIBROUS TEXTURE FOR TURBINE ENGINE BLADE MADE OF COMPOSITE MATERIAL

CROSS-REFERENCE TO RELATED APPLICATIONS

This patent application is a national stage application of International Application No. PCT/FR2021/050304, filed on Feb. 19, 2021, which claims benefit to French Application No. FR2002078, filed on Mar. 2, 2020

TECHNICAL FIELD

The invention relates to the general field of composite material parts for aircraft. More precisely, the invention relates to a fibrous texture intended to form the reinforcement of a turbine engine blade made of composite material.

PRIOR ART

In the field of aircraft turbine engines, reducing the mass of parts is a major problem both in terms of manufacturing costs of these parts, as well as in terms of the energy and environmental efficiency of the turbine engines. This problem has rapidly led to the development of composite material parts, in particular organic-matrix composite materials (OMC) in order to replace the conventional metal parts in various sections of the turbojet engine, such as the low pressure compressor blades.

The location of these blades, for example in the fan or the compressor, can expose them to impacts with objects of various types (birds, gravel, blocks of ice, sand, etc.) and the blades can then be damaged or eroded.

At the leading edge of the composite blades, it is useful to have a metallic protection (foil for example) in order to protect it against impacts while saving mass and having reduced erosion. At other locations, such as at the trailing edge or at the tip for example, the body of the composite material blades of the fan may have low thickness zones in order to meet the aerodynamic constraints, which are also likely to be damaged in the event of impact.

There is therefore a need for a reduced mass turbine engine blade with an optimised resistance to impacts.

DISCLOSURE OF THE INVENTION

To this effect, the invention proposes a fibrous texture intended to form the fibrous reinforcement of a turbine engine blade made of composite material comprising a fibrous reinforcement densified by a matrix, the texture being in a single piece and having a three-dimensional weave between a plurality of warp yarns or strands made of first fibres (or first fibrous material) extending in a radial direction, and a plurality of first fibre weft yarns or strands extending in a chord direction, the texture comprising a blade root portion and a blade aerofoil portion extending between the blade root portion and a free end of the fibrous texture. The fibrous texture is characterised in that the blade aerofoil portion has a reinforced area in the vicinity of the free end of the texture comprising weft yarns or strands made of second fibres (or second fibrous material) different from the first fibres (or first fibrous material), this second type of fibres having an elongation at break greater than that of the first fibres, and characterised in that a first ratio of second fibres in the reinforced area is greater than a second ratio of second fibres in the rest of the blade aerofoil portion.

The term "ratio of second fibres in a texture portion", means the ratio between the quantity (by volume) of second fibres and the quantity of first fibres in this portion. The yarns or strands can consist uniquely of fibres of a same material. The term "three-dimensional weaving" or "3D weaving" should be understood as meaning a method of weaving by which at least some warp threads connect weft threads over a plurality of weft layers. A reversal of roles between warp and weft is possible in the present text and should also be considered covered by the claims.

With such a fibrous texture, it is possible to produce a blade that is better able to resist the impact of objects. The larger elongation at break of the second fibres located in the reinforced area allows the blade which includes such a texture as reinforcement to withstand these impacts without significantly increasing its mass. The use of second fibres for weft yarns or strands makes the manufacture of such a fibrous texture easy since it is sufficient to replace the first fibre weft yarns or strands by those made of second fibres during the weaving on a loom, as will be detailed below.

In an exemplary embodiment, the reinforced area can extend from the free end of the fibrous texture over a length less than or equal to 40% of the total length of the texture measured in the radial direction, for example over a length less than or equal to 10% of this total length of the texture.

In an exemplary embodiment, in the reinforced area, the second fibre weft yarns or strands can mostly be present in a layer at the surface of the fibrous texture. The layer can have a thickness less than the thickness of the fibrous texture, and a ratio of second fibres in the layer can be greater than the ratio of second fibres in the rest of the thickness of the texture.

In an exemplary embodiment, the texture can have a face corresponding to a suction face of the blade, and the layer can extend from said face.

This location at the surface of the fibrous texture makes it possible to limit the damage in compression and in traction in the weft direction during impacts, and makes it possible for the blade which comprises such a texture as reinforcement to retain its geometry. Such an arrangement further allows the number of second fibre weft yarns or strands that are used to be reduced and therefore the mass of the assembly.

In an exemplary embodiment, the first fibres can be made of carbon and the second fibres can be made of a material chosen from the following: glass, basalt, aramid or polyester.

In an exemplary embodiment, the material of the first fibres and of the second fibres can be carbon.

In an exemplary embodiment, the first ratio can be between 10% and 70%, more preferably between 20% and 40%.

Another object of the invention is a fan blade made of composite material comprising a fibrous reinforcement densified by a matrix, the fibrous reinforcement of the blade being formed by a fibrous texture such as that described above.

In an exemplary embodiment, the blade can further comprise a metallic leading-edge, said metallic leading edge covering the ends of the second fibre weft yarns or strands of the reinforced area of the fibrous reinforcement. This arrangement enables the metallic leading edge to protect the ends of these weft yarns or strands against erosion.

Finally, the invention relates to an aeronautical turbine engine comprising a fan including a rotating disc and a plurality of blades such as that presented above mounted on the rotating disc.

A method for manufacturing a fan blade made of composite material comprising a fibrous reinforcement densified by a matrix can comprise the following steps: a fibrous texture like that described above is produced, said texture is shaped in order to obtain a blade preform, and a matrix is formed in the porosity of the preform in order to obtain the blade. The fibrous texture is obtained by three-dimensional weaving, and can have, for example, an interlock type weave. The matrix can be an organic matrix and be obtained from a resin.

The matrix can thus be formed by injection moulding of resin (RTM method or "Resin Transfer Moulding").

BRIEF DESCRIPTION OF THE FIGURES

Other features and advantages of the present invention will become apparent from the description given below, with reference to the appended drawings which illustrate exemplary embodiments that are in no way limiting. In the figures:

FIG. 1 is a schematic view in longitudinal section of an aeronautical turbine engine.

FIG. 2 shows an aeronautical turbine engine fan blade according to an embodiment of the invention.

FIG. 3 shows a fibrous texture according to an embodiment of the invention.

FIG. 4 shows a cross-sectional schematic view of the fibrous texture of the FIG. 3.

FIG. 5 shows an expanded view of FIG. 4 at a face of the texture corresponding to a suction face where the path of the yarns can be seen.

FIG. 6 shows the location for a metallic leading edge on an aeronautical turbine engine fan blade according to an embodiment of the invention.

DESCRIPTION OF THE EMBODIMENTS

FIG. 1 shows a schematic view in longitudinal cross-section of an aeronautical turbine engine 1, here a turbofan engine centred on the axis A-A. It includes, from upstream to downstream in the direction of flow F of the gaseous flow in the turbine engine: a fan 2, a low-pressure compressor 3, a high-pressure compressor 4, a combustion chamber 5, a high-pressure turbine 6 and a low pressure-turbine 7.

The fan 2 comprises, in particular, a rotating disc 8 on which are mounted a plurality of fan blades 10, one of which is shown in FIG. 2.

The fan blade 10 extends in the radial or longitudinal direction L between a root 11 and a free end 12, and in a chord, axial or transverse direction T between a leading edge 13 and a trailing edge 14. Between the root 11 and the end 12, the blade includes a stilt 15 and an aerofoil body 16 located between the stilt 15 and the end 12. The fan blade 10 is made of composite material comprising a fibrous reinforcement densified by a matrix.

In the illustrated example, the blade 10 has a metallic leading edge 17, in the form of a metal foil for example. Such a metallic leading edge 17 can be fixed after having obtained the blade 10, or be integrated with the blade 10 during its manufacturing process, in known manner.

FIG. 3 shows a schematic view of a fibrous texture 100 intended to form the fibrous reinforcement of a turbine engine blade such as that of FIG. 2. This fibrous texture can be obtained, for example, by three-dimensional weaving in a Jacquard loom of a fibrous blank and cutting the excess yarns of the woven fibrous blank.

The fibrous texture 100 can have three-dimensional weaving, and mostly comprise an interlock or multilayer weave, for example. The term "interlock weave", should be understood to mean three-dimensional weaving, in which each layer of warp yarns connects a plurality of layers of weft yarns with all the yarns of the same warp column having the same movement in the weave plane. Document WO2006/136755 describes the production of such weaves. As will be described subsequently, this fibrous texture can be shaped than densified in order to obtain a fan blade 10 such as that illustrated in FIG. 2.

The fibrous texture 100 extends in the radial direction L between a blade root portion 110 and a blade aerofoil portion 120. The texture 100 has a free end 121 located at the end of the blade aerofoil portion 120 opposite the root portion 110. There is a blade stilt portion 130 between the blade root portion 110 and the blade aerofoil portion 120. In general the blade root portion 110 is thicker than the blade stilt portion 130, and the thickness of the blade aerofoil portion 120 is variable. The fibrous texture 100 extends in the chord direction T between a first edge 101 intended to form the leading edge 13 of the blade 10 and a second edge 102 intended to form the trailing edge 14 of the blade 10.

In the illustrated example, the radial direction L also corresponds to the general direction in which the warp yarns extend in the fibrous texture 100, while the chord direction T corresponds to the general direction in which the weft yarns extend. It will be noted that, throughout the text, warp and weft can be inverted.

The fibrous texture 100 has a three-dimensional or multilayer weave between a plurality of warp yarns made of first fibres and a plurality of weft yarns made of first fibres. According to the invention, the fibrous texture 100 also has weft yarns made of second fibres, different from the first, and which have an elongation at break greater than that of the first fibres. More precisely, the fibrous texture 100 has a reinforced area 140 in the vicinity of the free end 121 of the texture 100 which comprises weft yarns made of second fibres. A first ratio of second fibres in the reinforced area is greater than a second ratio of second fibres in the remainder of the blade aerofoil portion 120. In a particular embodiment, the fibrous texture comprises first and second fibres only in the reinforced area, the rest of the texture comprising another type of fibres. In other words, the second fibres are mostly present in the reinforced area 140 in the blade aerofoil portion 120, and located in the weft yarns of said area 140.

The reinforced area 140 can extend from the free end 121 of the fibrous texture 100 over a length L1 less than or equal to 40% of the total length L0 of the texture 100 measured in the radial direction L, for example over a length less than or equal to 10% of this total length of the texture.

The material of the first fibres can be carbon. The material of the second fibres can be chosen from the following: carbon, glass, basalt, aramid, polyester or a combination of these materials. The following table gives common elongations at break of several fibres that can be used.

TABLE 1

| Fibre material - Reference | Elongation at break (%) |
|---|---|
| HexTow ® IM7 | 1.9 |
| Toraya ® T700 | 2.1 |
| Toraya ® T30S | 1.9 |
| Toraya ® T1000 | 2.2 |
| Toraya ® T1100 | 2 |

TABLE 1-continued

| Fibre material - Reference | Elongation at break (%) |
|---|---|
| Glass - GY "S-2 Glass ®" | 5.2 |
| Glass - "E-glass" | 4.4 |
| Polyester | 3.5 |
| Basalt | 3 |
| Aramid - Dupont "Kevlar ® 49" | 2.4 |

For example, carbon can be chosen for the first fibres and glass for the second fibres. It is also possible to use several types of weft yarns or strands which comprise different fibres having an elongation at break greater than that of the first fibres. It will be noted that the material of the first and second fibres can be identical. For example, the first and second fibres can be made of carbon, provided that their elongations at break are different. For example, it is possible to choose first carbon fibres made of HexTow® IM7 (marketed by Hexcel), and second carbon fibres made of Torayca® T1000 (marketed by Toray).

The elongation at break of the first fibres can be, for example, less than or equal to 2.1%, and that of the second fibres greater than or equal to 2.4%.

FIGS. 4 and 5 show an embodiment of the invention in which the second fibre yarns or strands are only present in a layer at the surface of the fibrous texture 100.

FIG. 4 shows a sectional view of the texture 100. When the yarns are present in a layer having a predetermined thickness and located at the surface of the fibrous texture (the predetermined thickness being less than the total thickness of the fibrous texture at the considered location), it is also said that the yarns are present "in the skin" of the fibrous texture 100. In this view, it is possible to identify a first face 103 of the fibrous texture 100 intended to form a blade pressure face, and a second face 104 opposite the first face intended to form a blade suction face. In this example, the second fibre weft yarns are located in the reinforced area 140 in a layer 141 situated at the surface of the texture 100 and on the side of the second face 104. This arrangement makes it possible to modify the mechanical properties of the blade only in the skin areas which are the most stressed during impacts.

FIG. 5 shows an enlarged view of FIG. 4 where the path of the different yarns of the layer 141 can be seen. In the weave shown, five layers of warp yarns C1 to C5 and five weft yarns T1 to T5 can be seen. The weft yarn T1 is woven into the skin with a two-dimensional satin weave, whereas the yarns T2 to T5 describe a three-dimensional interlock weave. The warp yarns C1 to C5 and weft yarns T3 to T5 can be made of first fibres, and the weft yarns T1 and T2 present in the layer 141 can be made of second fibres.

FIG. 6 shows another advantageous feature of the invention, concerning the positioning of the metallic leading edge relative to the ends or terminations of the second fibre weft yarns.

Second fibre weft yarns T6, T7 and T8, which are located in the reinforced area 140, are shown schematically in FIG. 6. After weaving, the weft yarns T6 to T8 exit the fibrous texture 100 at the locations identified by crosses. The fact that the exits of the weft yarns are not necessarily at the same level in the chord direction T is due to the variation in the number of warp yarns along the texture 100 in order to optionally give it a thickness variable.

It is advantageous to provide that the metallic leading edge 17 which will be fixed on the fan blade 10 covers the ends of the weft yarns or strands T6 to T8 (once the unwoven portions of these yarns are cut) in order to protect against erosion. In FIG. 6, the location of the metallic leading edge 17 is indicated by dashes and it can be seen that the ends or termination of the yarns T6 to T8 (located at the level of the cross) will be well covered by this.

In order to obtain a fan blade 10 such as that shown in FIG. 2, a fibrous texture 100 is produced by three-dimensional weaving, said texture is shaped in order to obtain a blade preform having the suitable geometry, and a matrix is shaped in the porosity of the preform in order to obtain the blade. It is possible, at the time of weaving, to replace weft yarns made of first fibres by weft yarns made of second fibres in the reinforced area 140 of the fibrous texture. The fan blade 10 can be produced by a resin transfer moulding process (RTM) where the preform is placed in a mould having the shape of the blade and into which a resin is injected then polymerised. In this context, the matrix can be an organic matrix so and be obtained from an epoxy resin.

The invention claimed is:

1. A blade for a turbine engine made of composite material comprising a fibrous reinforcement densified by a matrix, the fibrous reinforcement consisting of a fibrous texture, the texture being in a single piece and having a three-dimensional weave between a plurality of first fiber warp yarns or strands extending in a radial direction and a plurality of first fiber weft yarns or strands extending in a chord direction, the texture comprising a blade root portion and a blade airfoil portion extending between the blade root portion and a free end of the fibrous texture opposite the blade root,
wherein the blade airfoil portion has a reinforced area in the vicinity of the free end of the texture comprising weft yarns or strands made of second fiber different from the first fiber, the second fiber having an elongation at break greater than that of the first fiber, and in that a first ratio of second fiber in the reinforced area is greater than a second ratio of second fiber in the remainder of the rest of the blade airfoil portion.

2. The blade according to claim 1, wherein the reinforced area extends from the free end of the fibrous texture over a length less than or equal to 40% of the total length of the texture measured in the radial direction.

3. The blade according to claim 1, wherein, in the reinforced area, the second fiber weft yarns or strands are mostly present in a surface layer of the fibrous texture.

4. The blade according to claim 3, wherein the texture has a face-corresponding to a suction face of the blade, and the layer extends from said face.

5. The blade according to claim 1, wherein the first fibers are made of carbon and the second fibers are made of a material chosen from the following: glass, basalt, aramid or polyester.

6. The blade according to claim 1, wherein the first ratio is between 10% and 70%.

7. The blade according to claim 1, wherein the blade is a fan blade.

8. The fan blade according to claim 7, further comprising a metallic leading-edge, said metallic leading edge covering ends of the second fiber weft yarns or strands of the reinforced area of the fibrous reinforcement.

9. An aeronautical turbine engine comprising a fan comprising a rotating disc and a plurality of blades according to claim 7 mounted on the rotating disc.

* * * * *